(12) United States Patent
Shipley (10) Patent No.: US 9,151,828 B2
(45) Date of Patent: Oct. 6, 2015

(54) SYSTEMS AND METHODS FOR NEAR FIELD TARGET SIMULATION

(75) Inventor: Charles A. Shipley, Woodland Hills, CA (US)

(73) Assignee: Technology Service Corporation, Silver Spring, MD (US)

( * ) Notice: Subject to any disclaimer, the term of this patent is extended or adjusted under 35 U.S.C. 154(b) by 545 days.

(21) Appl. No.: 13/536,982

(22) Filed: Jun. 28, 2012

(65) Prior Publication Data

US 2013/0002474 A1 Jan. 3, 2013

Related U.S. Application Data

(60) Provisional application No. 61/502,707, filed on Jun. 29, 2011.

(51) Int. Cl.
*G01S 7/40* (2006.01)
*H01Q 21/06* (2006.01)
*H01Q 21/22* (2006.01)

(52) U.S. Cl.
CPC ............ *G01S 7/4052* (2013.01); *H01Q 21/062* (2013.01); *H01Q 21/225* (2013.01); *G01S 2007/4086* (2013.01); *G01S 2007/4095* (2013.01)

(58) Field of Classification Search
CPC .............. G01S 7/4021; G01S 7/4052; G01S 2007/4095; G01S 2007/4086; H01Q 21/062; H01Q 21/225
USPC .......................................................... 342/171
See application file for complete search history.

(56) References Cited

U.S. PATENT DOCUMENTS

| 3,879,733 | A | * | 4/1975 | Hansen et al. | ................ 342/360 |
| 4,630,053 | A | | 12/1986 | Green, Jr. et al. | |
| 5,081,460 | A | | 1/1992 | Liu | |
| 5,223,840 | A | | 6/1993 | Cronyn | |
| 5,247,843 | A | * | 9/1993 | Bryan | .......................... 73/865.6 |

(Continued)

FOREIGN PATENT DOCUMENTS

| CN | 101738603 | 6/2010 |
| EP | 0 164 504 | 12/1985 |

(Continued)

OTHER PUBLICATIONS

Duchesne, L. et al., "Compact Multi-Probe Antenna Test Station for Rapid Testing of Antennas and Wireless Terminals," *10th Asia-Pacific Conference on Communications and the 5th International Symposium on Multi-Dimesional Mobile Communications Proceedings*, vol. 2, pp. 553-557 (Sep. 2004).

(Continued)

*Primary Examiner* — Frank J McGue
(74) *Attorney, Agent, or Firm* — Finnegan, Henderson, Farabow, Garrett & Dunner LLP (57) ABSTRACT

A simulation device and a system and method for using the simulation device are disclosed. The simulation device may contain a plurality of antenna elements positionable on or near a radar or other sensing device. The simulation device may be configured to control the plurality of antenna elements to transmit signals that simulate a reflection of an electromagnetic signal off of one or more targets of particular sizes at particular azimuths, elevations, distances, trajectories, and/or velocities.

27 Claims, 10 Drawing Sheets

(56) References Cited

U.S. PATENT DOCUMENTS

| | | | |
|---|---|---|---|
| 5,477,229 A * | 12/1995 | Caille et al. | 342/360 |
| 5,721,554 A | 2/1998 | Hall et al. | |
| 6,075,480 A | 6/2000 | Deliberis, Jr. | |
| 6,114,985 A * | 9/2000 | Russell et al. | 342/169 |
| 6,115,003 A | 9/2000 | Kozakoff | |
| 6,346,909 B1 | 2/2002 | Johnson, Jr. et al. | |
| 6,366,244 B1 | 4/2002 | Fernandes | |
| 6,639,548 B2 | 10/2003 | Courtney et al. | |
| 7,119,739 B1 | 10/2006 | Struckman | |
| 7,170,446 B1 | 1/2007 | West et al. | |
| 7,714,782 B2 | 5/2010 | Davis et al. | |
| 2006/0092075 A1 | 5/2006 | Bruce et al. | |
| 2009/0058715 A1 | 3/2009 | Sarafian | |
| 2011/0279320 A1 * | 11/2011 | Dumon et al. | 342/368 |

FOREIGN PATENT DOCUMENTS

| | | |
|---|---|---|
| FR | 2709183 A1 | 2/1995 |
| GB | 2 405 761 | 3/2005 |
| GB | 2405761 A | 3/2005 |
| JP | 2005-134124 | 5/2005 |

OTHER PUBLICATIONS

Stupfel, Bruno et al., "Plane-Wave Synthesis by an Antenna-Array and RCS Determination: Theoretical Approach and Numerical Simulations," *IEEE Transactions on Antennas and Propagation*, vol. 52, No. 11, pp. 3086-3095 (Nov. 2004).

Watkins, John R., "Utilizing Near-Field Measurements to Characterize Far-Field Radar Signatures," *Air force Institute of Technology* (Jun. 2004).

International Search Report in PCT/US2012/044604, mailed Mar. 22, 2013, 5 pages.

PCT Written Opinion in PCT/US2012/044604, dated Jun. 28, 2012, 8 pages.

International Preliminary Report on Patentability in PCT/US2012/044604, mailed Oct. 25, 2013, 22 pages.

\* cited by examiner

FIG. 1
(PRIOR ART)

MOTION LAUNCHER

SYSTEMS AND METHODS FOR NEAR FIELD TARGET SIMULATION

I. RELATED APPLICATIONS

This application claims priority to U.S. Provisional Patent Application No. 61/502,707 filed Jun. 29, 2011, the contents of which are incorporated herein by reference.

II. TECHNICAL FIELD

The present disclosure relates to the field of testing sensor and radar systems, and, more particularly, to systems and methods for simulating target objects in testing.

III. BACKGROUND OF THE DISCLOSURE

In recent years, advances in the accuracy and portability of sensing and radar systems have led to their increased use in the detection of target objects. As a result, more people now rely on the accuracy of these systems than ever. For example, the portability and accuracy of the Lightweight Counter-Mortar Radar (LCMR) system has led to its increased use in field operations. People stake their lives on the accuracy of these radar systems when used in the field. As such, testing an LCMR system for accuracy is of utmost importance.

Figure 1:
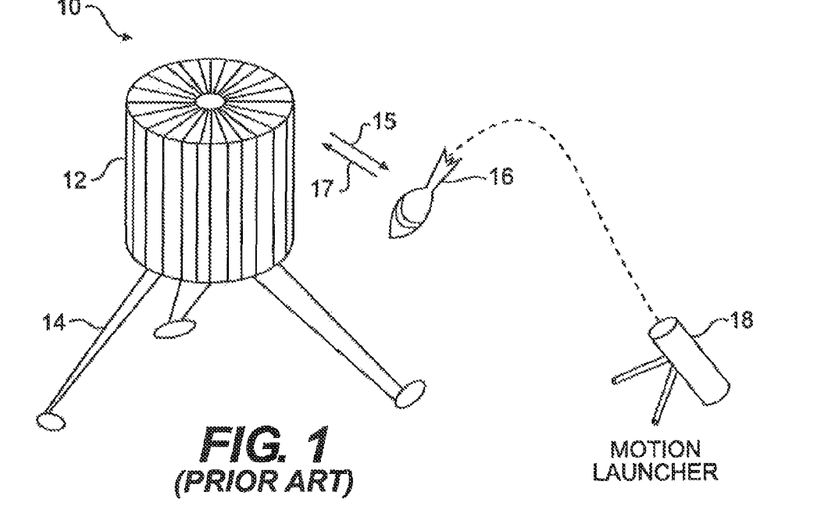
FIG. 1 illustrates an exemplary LCMR radar system.

FIG. 1 illustrates a real-world application of an LCMR system in the field. LCMR systems are used to detect and locate one or more moving objects and to calculate a prior location of the one or more moving objects. One typical application of an LCMR system is to determine the firing locations of launchers. Portable LCMR systems can be transported into the field by vehicles or parachutes, or can be disassembled and carried by one or more individuals. Once in the field, an LCMR system can quickly be assembled. In the illustration of FIG. 1, LCMR system 10 provides 360-degree surveillance by scanning with a cylindrically phased array antenna 12 mounted on a tripod 14. Antenna 12 scans the surrounding area by generating beams of radio frequency radiation 15. When an object 16 is within the field of the LCMR system, the beam of radiation is reflected off of the object and reflected beam 17 is detected by LCMR system 10. The detected object is then tracked to determine the object's trajectory. A processor (not shown) then performs a calculation based on the trajectory to determine the location of a launcher 18 that fired the object. Having determined the location of firing launcher 18, appropriate action can be taken to disable launcher 18. Nevertheless, the accuracy of the location information generated by an LCMR system is important in taking these countermeasures. As such, LCMR systems need to be thoroughly tested before use.

One traditional method for testing LCMR systems and other sensing and radar systems involves live-fire testing. With live-fire testing, a real-world field scenario is created at an outdoor range. For example, testing personnel set up a launcher in a specific location on an outdoor range, fire a shell, and determine whether the LCMR system accurately determines the firing location. This testing scenario looks just like the real-world example in FIG. 1 with the exception that, rather than being operated in the field, the LCMR is operated on a controlled outdoor testing range. However, live-fire testing is suboptimal, because it is time consuming, harmful to the environment, and expensive, both in terms of the quantity of shells that need to be fired and in the amount of testing ground resources that need to be consumed.

Figure 2:
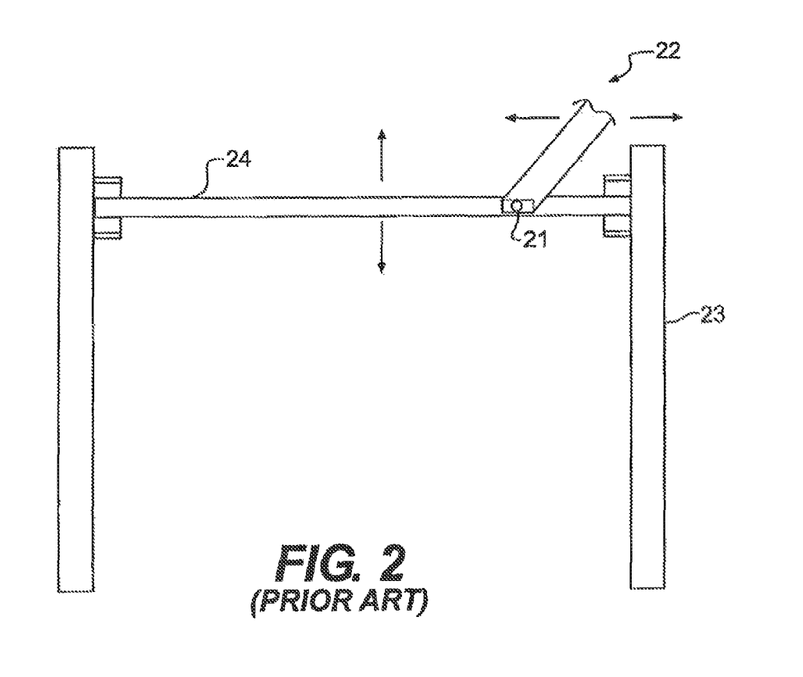
FIG. 2 illustrates an exemplary near-field scanner for testing and characterizing a beam pattern of an antenna.

FIG. 2 illustrates another method for testing sensor and radar systems, called "near field scanning." With near field scanning, an antenna probe 21 is moved to a position in a two-dimensional frame 22. The probe is moved along a vertical axis along a vertical arm 23 of the frame and a horizontal axis along a horizontal arm 24 of the frame. The probe moves around the frame to cover the whole array of the frame, similar to a raster scan. By probing the radiation from the sensor or radar system at the different locations, the near field scanner is able to characterize the beam pattern of the system. However, these near field testing systems are also suboptimal, because they only characterize the electric and magnetic fields of the antenna radiation and do not accurately test real-world applications of sensor and/or radar systems.

Figure 3A:
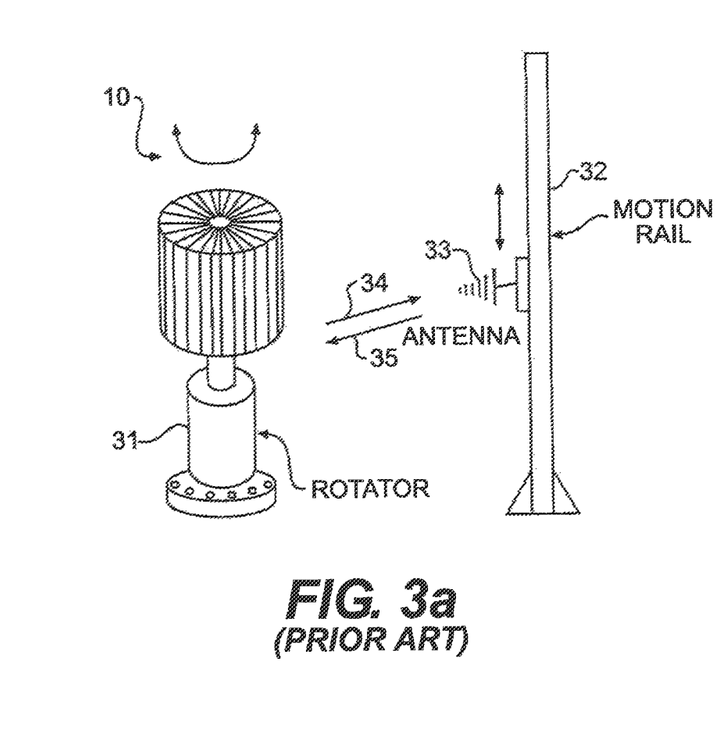
FIG. 3a illustrates an exemplary mechanical live-fire testing system for testing an LCMR radar system.
Figure 3B:
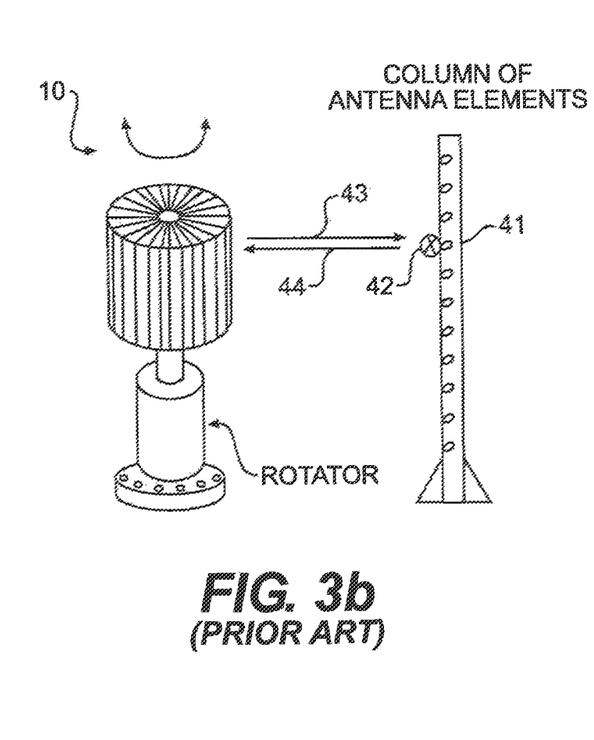
FIG. 3b illustrates an exemplary electrical live-fire testing system for testing an LCMR radar system.

FIGS. 3a and 3b illustrate alternative approaches being used to test real-world applications of scanning and/or radar systems. FIG. 3a illustrates a mechanical live-fire test set (MLFTS) for testing an LCMR system. Using this approach, LCMR system 10 is taken off of its tripod stand and placed on a rotator device 31. A vertical motion rail 32 with a controllable antenna probe 33 is placed in the field of LCMR system 10. A target object can be simulated at various elevations by controllably moving antenna probe 33 vertically up and down motion rail 32. Various azimuths of the target object can be simulated by rotating LCMR system 10 with rotator device 31. In testing a simulated target object at a specific desired location, rotator device 31 rotates LCMR system 10 to a desired azimuth and motion rail 32 moves probe antenna 33 vertically to the desired elevation. LCMR system 10 then sends a beam of radio frequency radiation 34 into the field, where it is detected by antenna probe 33. Antenna probe 33 acts as a repeater and transmits a beam of radio frequency radiation 35 that is calibrated to simulate the reflected radiation off of the simulated target and back to LCMR system 10.

FIG. 3b illustrates an electronic live-fire test set (ELFTS) for testing an LCMR system 10. The ELFTS operates similarly to the MLFTS, but uses a column of antenna elements 41 rather than a single antenna probe on a motion rail. When an antenna element at a particular vertical placement along the electronic rail, location 42 for example, detects a radiation beam 43 from LCMR system 10, the antenna element at location 42 acts as a repeater and transmits a beam of radio frequency radiation 44 that is calibrated to simulate the reflected radiation off of the simulated target back to LCMR system 10.

While the MLFTS and ELFTS testing approaches are improvements over prior sensor and/or radar testing approaches, they still have significant costs and inefficiencies associated with them. For example, MLFTS and ELFTS testing is performed in an anechoic chamber in order to mitigate electronic interference from the environment. These chambers must be large to accommodate the radar structure and testing apparatus, are expensive to create, and require LCMR systems to be transported to the chamber facility. Furthermore, radar target simulation using antennas normally requires that the injection antenna be placed in the radar antenna far-field. If the target trajectories involve high elevation angles, an impractically tall injection antenna support is needed. This is especially true for high radar bands and/or large radar apertures. As a result, the motion rail of the MLFTS must be very tall in height and cannot be easily transported to different locations. The vertical column of antenna elements of the ELFTS has been modified into ruggedized, all-weather versions that can be disassembled for transport into the field. Nevertheless, these versions require a great deal of time and effort in setup, as the column of antenna elements must be assembled to great height and the LCMR system must still be placed on a rotator device in the field.

Accordingly, there is a need for a portable, efficient, and inexpensive approach for testing LCMR systems and other sensor and/or radar systems that can be used to more easily test these systems in a variety of desired locations. There is also a need for a system and method for variable geometry moving target injection that is compact and that does not compromise normal radar operation. Furthermore, there is a need to broaden the scope and application of radar testing systems and methods to more sensor and target types both inside and outside anechoic chambers.

The systems and methods of the present disclosure address one or more of the problems set forth above.

IV. SUMMARY

In accordance with one exemplary embodiment, a simulation device is disclosed. The simulation device can, for example, be a near-field target simulation (NFTS) device. The simulation device may include a planar screen of antenna elements positionable on or near an LCMR or other radar system. The screen may include a plurality of slats disposed within a frame, and each slat may have a plurality of dipole antenna elements disposed at fixed intervals along the length of the slat. The simulation device may be configured to simulate one or more targets of particular sizes and shapes at particular azimuths, elevations, distances, trajectories, and/or velocities. The target may be simulated by receiving a radiation beam from an LCMR system or other radar system, calculating the characteristics of a beam that would be expected to reflect from a target object with the particular characteristics, and controlling the signals transmitted from each of the dipole antenna elements within the screen, so as to generate a plane wave that accurately reflects the characteristics of the reflection that the LCMR system or other radar system would expect to receive from a real target having those characteristics.

In accordance with another exemplary embodiment, a system for testing an LCMR system with a simulation device is disclosed. The system may include a processor configured to control and coordinate adjustments to the dipole elements within the screen in order to generate the desired plane wave; a motor configured to mechanically rotate the simulation device around the LCMR system; a memory configured to store instructions for carrying out the testing operation; and/or a power supply that supplies power to the processor, motor, LCMR system, memory, and/or any other components requiring power.

In yet another exemplary embodiment, a method for testing an LCMR system with a simulation device is disclosed. The method may include receiving characteristic parameters of a target object that is desired to be simulated; sending instructions to rotate the simulation device to an azimuth of the target object; receiving a radiation beam at the simulation device from the LCMR system; calculating characteristics of a reflection beam that would be expected given the beam from the LCMR system and the characteristics of the simulated target object; sending instructions to beam formers in the simulation device to generate a beam corresponding to the expected reflection beam; calculating adjustments to signals from each dipole antenna in order to generate the desired plane wave reflection beam; making the adjustments at the individual dipole antenna level; and transmitting from all of the dipole antennas simultaneously, thereby generating the desired plane wave beam that accurately represents the expected reflection beam.

In still another exemplary embodiment, a simulation device is disclosed that may have a curved arrangement rather than the planar arrangement discussed above.

In another exemplary embodiment, a simulation device is disclosed that may have a conformal arrangement that extends around the LCMR system.

In yet another exemplary embodiment, a simulation device is disclosed in which dipole antennas are disposed in a screen, such as a radome.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings, which are incorporated in and constitute a part of this specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

VI. DETAILED DESCRIPTION

Reference will now be made in detail to the present embodiments of the disclosure, certain examples of which are illustrated in the accompanying drawings.

Figure 4:
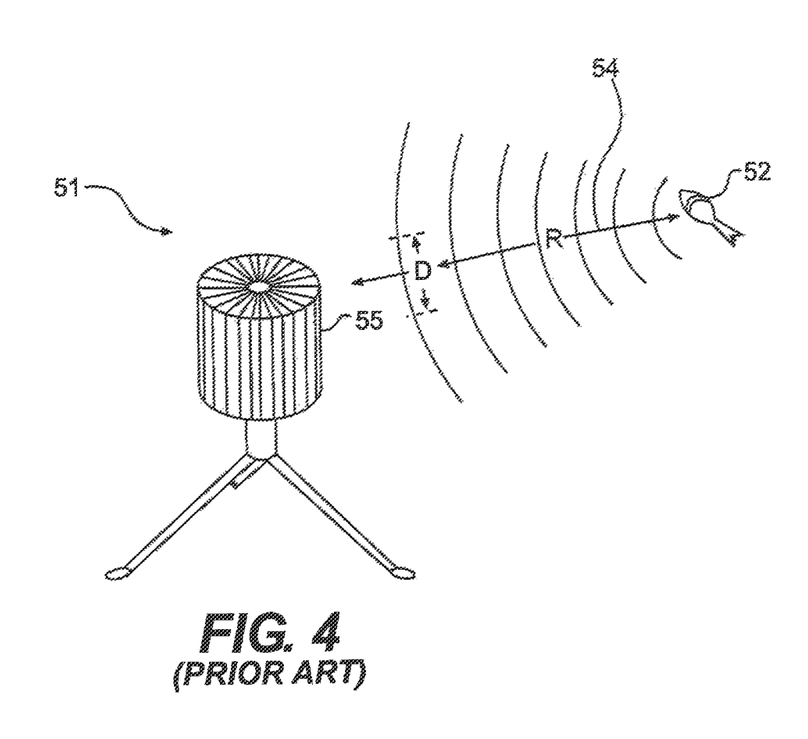
FIG. 4 illustrates an exemplary radar beam reflection off of an object, as it appears to an exemplary LCMR system.

FIG. 4 depicts, in further detail, an exemplary application of an LCMR system 51. Radio frequency beams are generated by LCMR system 51 for scanning the environment in 360 degrees. When a target object 52 exists in the field of LCMR system 51, an emitted radio frequency beam is reflected back from target object 52 to LCMR system 51. As illustrated in FIG. 4, the reflected radiation consists of spherical wave fronts. As such, the distance between target object 52 and LCMR system 51 can be represented as the radius "R" of wave front 54 at the time it reaches LCMR system 51. Given that target object 52 is in the far field, the distance from the LCMR system is much greater than the size "D" of antenna aperture 55 of LCMR system 51. As such, the part of the spherical wave front that is intercepted by antenna aperture 55 of LCMR system 51 is nearly planar. Reception of reflected wave front 54 notifies LCMR system 51 that there is a target object 52 in the field. LCMR system 51 then continues transmitting beams and receiving the reflected beams to track the trajectory of the identified target object. With this trajectory information, LCMR system 51 is able to calculate the launch location of the target object.

Figure 5:
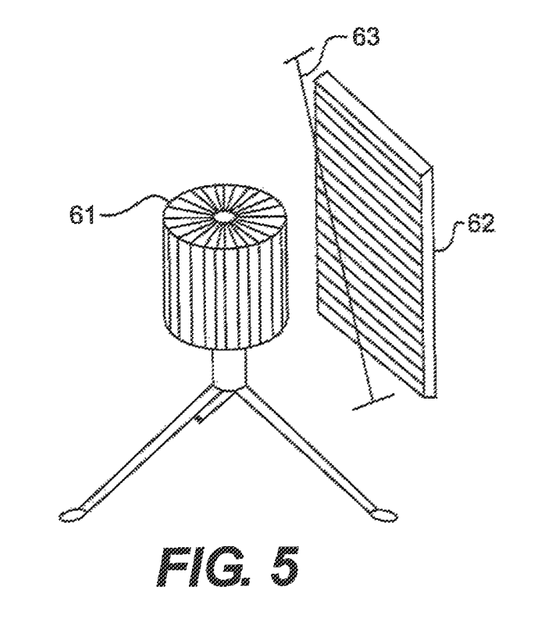
FIG. 5 illustrates an exemplary simulation device according to an embodiment of the invention.

FIG. 5 depicts an exemplary embodiment of the present disclosure. A simulation device 62 is placed in the field of an LCMR system 61 or other sensing or radar system. Simulation device 62 can, for example, be a near field target simulation (NFTS) device placed in the near field of LCMR system 61. Simulation device 62 is a screen of antenna elements positionable on or near LCMR system 61. Simulation device 62 may be configured to act as a repeater, receiving radiation beam patterns from LCMR system 61 and transmitting back a radiation beam that is calibrated to simulate the reflection off of a target object in the field. Simulation device 62 may simulate this reflection by generating radiation with a planar wave front 63, thereby accurately representing the planar portion of the spherical wave front that theoretically would have been received by an antenna aperture of LCMR system 61, for example, when used in the field, as illustrated in FIG. 4.

Figure 6A:
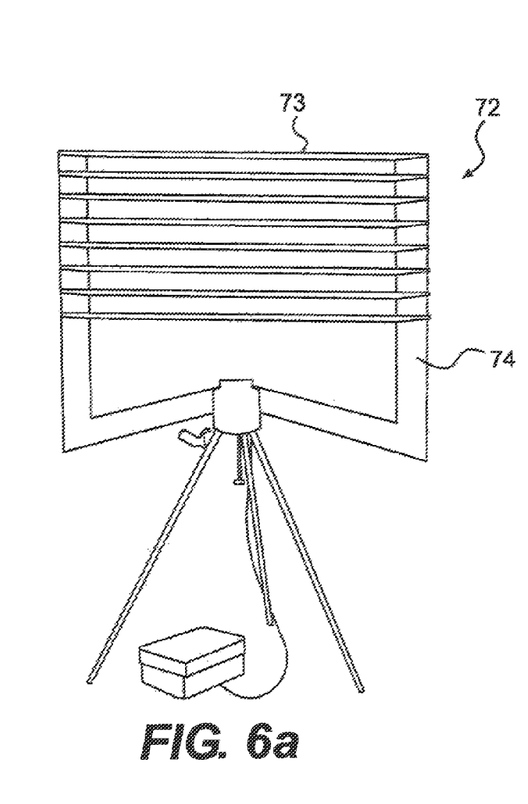
FIG. 6a illustrates a side view of an exemplary simulation device according to an embodiment of the invention.
Figure 6B:
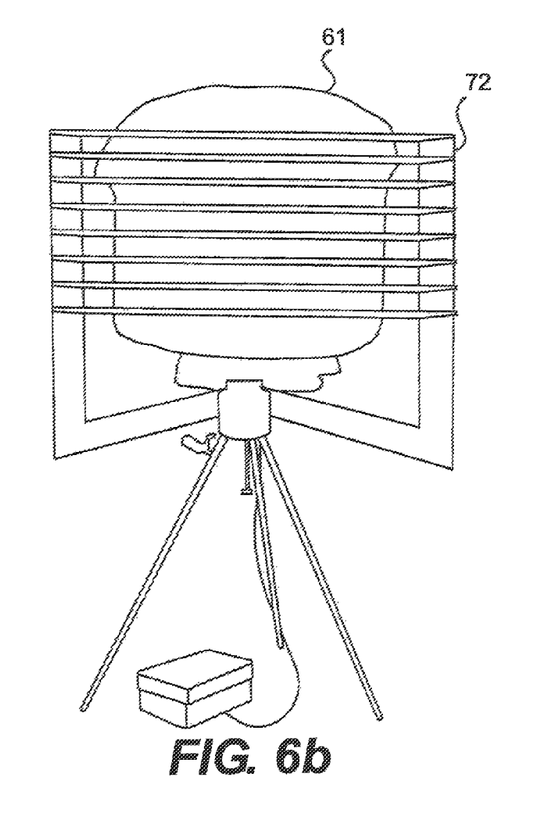
FIG. 6b illustrates a side view of an exemplary simulation device in operation testing an LCMR system.
Figure 6C:
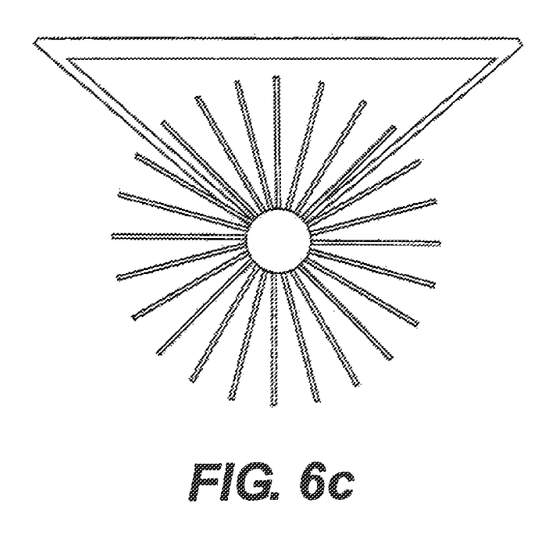
FIG. 6c illustrates a top view of an exemplary simulation device in operation testing an LCMR system.

FIG. 6a illustrates an exemplary embodiment of a simulation device 72. In one embodiment, simulation device 72 may include a plurality of rows of slats 73 within a frame 74. In one embodiment, slats 73 may be disposed horizontally within frame 74. Each slat 73 may comprise a thin metal strip placed orthogonal to the electric field of the LCMR radar antenna. Each slat 73 may have a plurality of dipole antennas (not depicted) placed at regular fixed intervals along the slat. The orthogonal placement of each slat to the E-field of the radar antenna may ensure that the thin metal strip and dipole antennas may avoid excess scattering of energy. As such, the simulation device may be transparent to the normal outgoing (transmitted) and incoming (from targets and the environment) plane waves. Nevertheless, the dipole antennas can still intercept sufficient signal from the radar transmission to detect the radiation pattern and can inject sufficient signal into the radar antenna to simulate a reflection off of a target object. FIG. 6b provides an illustration of simulation device 72 positioned in front of an LCMR system 61 for testing. FIG. 6c provides a top view illustration of a simulation device positioned in front of an LCMR system 61.

Figure 7:
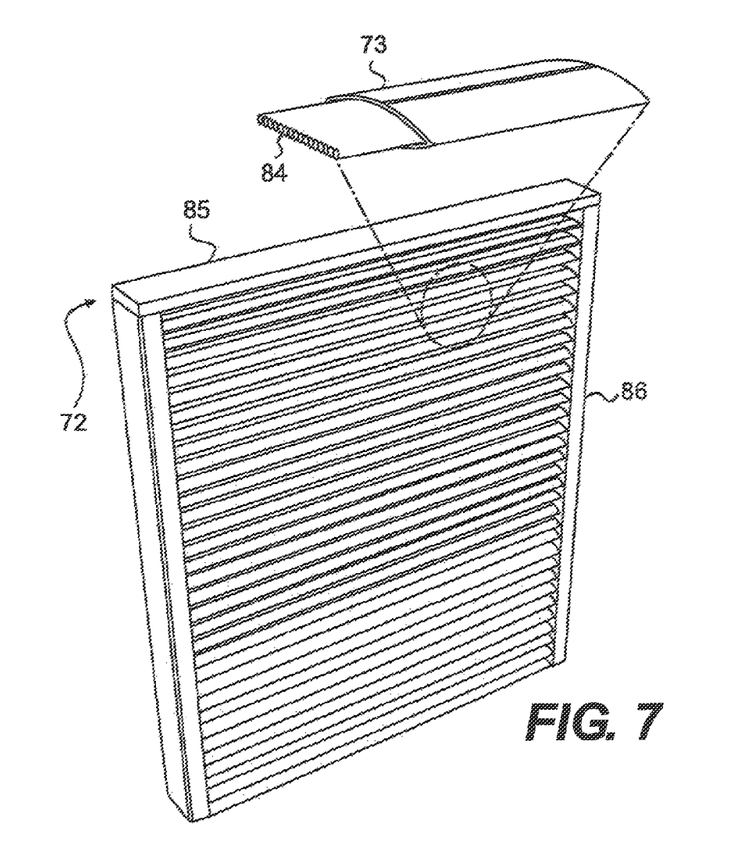
FIG. 7 illustrates a side view of an exemplary simulation device, illustrating in further detail an exemplary disposition of transmission lines.

FIG. 7 illustrates an exemplary embodiment of simulation device 72 in further detail. In one embodiment, a plurality of transmission lines 84 may be disposed within each slat 73. Each dipole antenna may have its own transmission line or lines transmitting signals to and from the dipole antenna. In one embodiment, the transmission lines 84 may be coaxial transmission lines, but may also include other transmission lines or a combination of other transmission lines, including but not limited to, Universal Serial Bus (USB), Institute of Electrical and Electronics Engineers 1394 (IEEE 1394 or FireWire), Ethernet, fiber optic, Shielded Twisted-Pair, and Unshielded Twisted-Pair. Each slat 73 may be a thin metal enclosure surrounding transmission lines 84 and may also be used as a ground plane for the dipole elements. The top 85 of the frame of simulation device 72 may enclose an azimuth beam former and phase controller for coordinating the dipole antennas in generating the injection beam for transmission. In one embodiment, one or both sides 86 of the frame may enclose elevation beam formers and phase controllers that also coordinate the dipole antennas in generating the injection beam for transmission. Thus, between the beam formers at the top and sides of the frame, simulation device 72 is configured to control both the elevation and azimuth angles of the injected plane wave being transmitted for detection by an LCMR radar and thus is able to accurately simulate a target's motion.

Figure 8A:
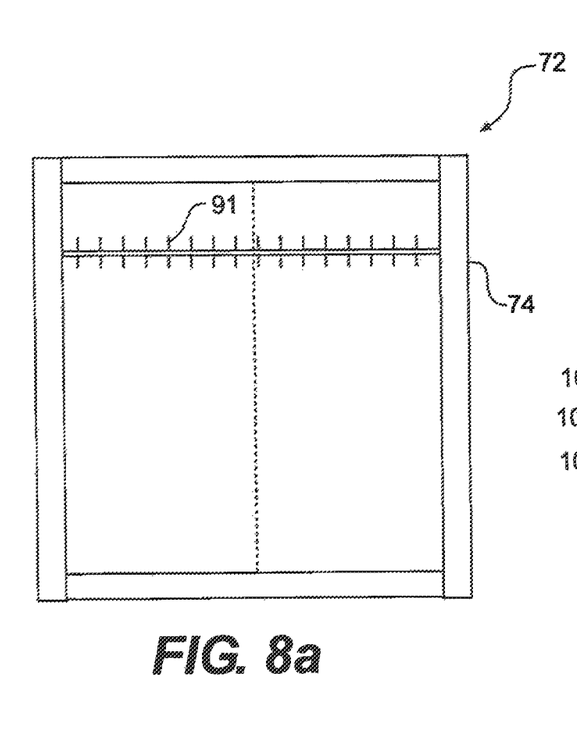
FIG. 8a illustrates a side view of an exemplary simulation device, illustrating in further detail an exemplary disposition of dipole elements along the horizontal slats.
Figure 8B:
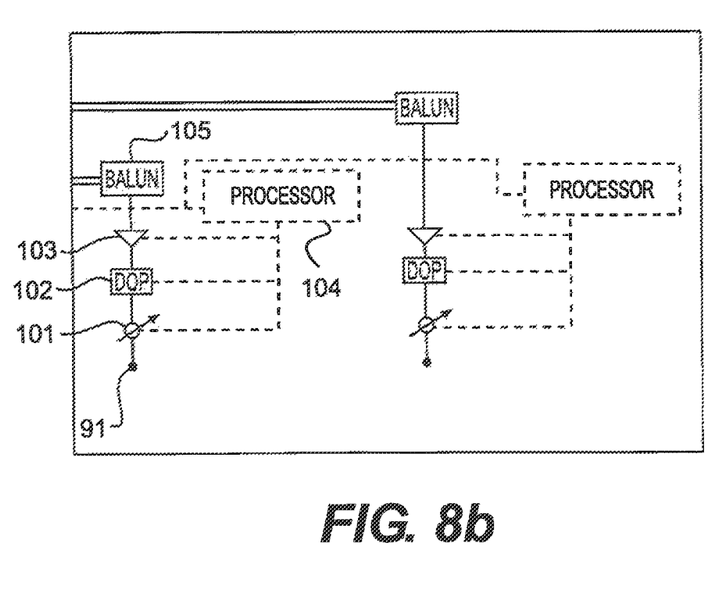
FIG. 8b illustrates a view of the exemplary components within a horizontal slat of an exemplary simulation device.

FIGS. 8a and 8b illustrate an exemplary embodiment of the disposition of dipole elements within each slat 73. FIG. 8a depicts a side view of a slat in an antenna array of simulation device 72. In one embodiment illustrated in FIG. 8a, sixteen dipole elements may be disposed at regular fixed intervals along each slat so that one half of each dipole is on top of each slat and the opposite half of each dipole is on the bottom of each slat. Each dipole element 91 in this embodiment may be vertically polarized, so as to match the electric field polarization of an LCMR radar system. In the embodiment illustrated in FIG. 8a, sixteen horizontal slats may be disposed at regular vertical fixed intervals within simulation device frame 74. As a result, the phased antenna array illustrated in FIG. 8a may consist of a 16×16 grid of dipole antenna elements. Although described as a 16×16 grid, the disclosed embodiments are not limited to these dimensions and could consist of greater or fewer dipole elements disposed within the array. In one embodiment, the dipole elements are arranged in a grid so as to have the same spacing as antenna elements in the radar or sensing device to be tested.

FIG. 8b illustrates a top view of one exemplary embodiment of a slat. In this embodiment, each dipole element 91 within each slat has its own phase shifter 101, doppler modulator 102, gain amplifier 103, optional processor chip 104, and surface mount balun transformer 105. The processor chip 104 may control phase shifter 101, doppler modulator 102, and/or gain amplifier 103 based on the desired beam to be formed for transmission from the simulation device. Control signals may be transmitted to each processor chip 104 indicating the modifications to make to the signal before radiating the signal from dipole element 91. Although FIG. 8b depicts a processor chip for each dipole element, the disclosed embodiments are not so limited. For example, the system could include one processing element per two or more dipole elements, per slat, or one for the entire frame. Control could then be implemented by sending appropriate control signals to appropriate components via a series of switching components.

A brief explanation of the exemplary elements disposed within each slat will now be provided. The surface mount balun transformer 105 may be used to match the signal on the coaxial input/output transmission line to the microstrip line for transmission to dipole element 91. Each dipole element 91 may have an individually controllable gain amplifier 103 to modify the amplitude of the outgoing signal. Each dipole element 91 may also have a doppler modulator 102. The doppler modulation may add doppler effects to the outgoing signal. Each dipole element 91 may further have a phase shifter. The phase shifter may allow the signal being output from the dipole element to be shifted in phase.

With each dipole element 91 in the array being controllable in amplitude, doppler effects, and/or phase, a reflection off of one or more target objects may be accurately simulated. By differentially applying phase control to the dipole elements within the array, constructive and destructive interference can be created and utilized to steer the beam to a particular angle. If a vertically rising target were to be simulated, for example, the phase across each slat in the horizontal direction may be the same, but the phase up and down the slats in the vertical direction may be modified by a processor to be a linear gradient. Differential amplitude control can be used to better simulate multiple targets within an environment. Absent individual gain amplifiers for each dipole element 91, the simulation device would only simulate multiple target objects if they were in different range cells within the environment. For example, if one target object were much farther away than the other, the simulation device could generate a signal simulating the reflection off the nearer object, and then generate a second signal simulating the reflection off the farther object at some calculated time delay. Nevertheless, the simulation device may not be capable of simulating multiple target objects within the same range cell. By providing each dipole element with a gain amplifier, differential amplitude can be created throughout the array. The simulation device may then be able to generate signals of varying amplitude throughout the array to simulate reflections off of multiple target objects within the same range cell. Doppler modulation may be used to simulate the doppler effects that a moving target object would have on a reflected signal. By applying differential doppler effects, the simulation device can generate signals of varying doppler effect to simulate reflections off of multiple target objects moving at differing velocities. As such, through use of phase shifters, gain amplifiers, and/or doppler modulators, differential effects can be created to better simulate target objects. Nevertheless, the disclosed embodiments are not so limited. One of ordinary skill in the art would recognize, for example, that the phase shifters could be excluded at the expense of the ability to simulate varying angles. One of ordinary skill in the art would also recognize that the gain amplifiers could be excluded at the expense of simulating multiple target objects in the same range cell. One of ordinary skill in the art would further recognize that the doppler modulators could be excluded at the expense of simulating differing doppler effects from multiple targets moving at varying velocities in the field. As such, any combination of the components could be provided or excluded at the expense of simulation accuracy.

Figure 9:
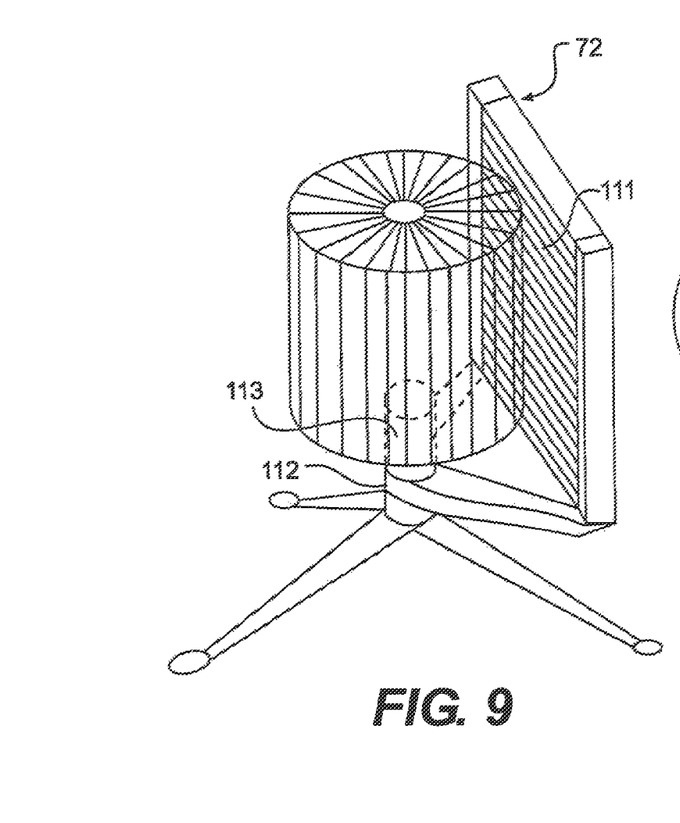
FIG. 9 illustrates a further view of an exemplary simulation device in operation testing an LCMR system.

FIG. 9 illustrates an exemplary embodiment of simulation device 72 for use in testing an LCMR radar system. In one embodiment, phased antenna array 111 of simulation device 72 may have a width and height that is greater than the width and height of the LCMR radar aperture. All metal parts of simulation device 72 within the scanning aperture of the LCMR radar system may be thin and horizontal to avoid blocking the vertically polarized radar signal. Simulation device 72 may be affixed to the LCMR system via supporting struts, one of which may be attached to the lower right hand corner of the frame and one of which may be attached to the lower left hand corner of the frame. The supporting struts may be hollow on the inside, so that data cables running to and from the phased antenna array can be routed through the struts. In one embodiment, the LCMR system may be disposed on a special tripod with a motorized azimuth rotator 112. The LCMR system may be affixed to the motorized azimuth rotator 112 with an adaptor 113. By affixing the simulation device in this way, the phased antenna array can be rotated 360 degrees around the LCMR system. As such, all 360 degrees of radar scanning performed by the LCMR system can be tested by mechanically rotating the simulation device. In an alternative embodiment, the simulation device could be placed near the LCMR system for testing, and need not be affixed to the LCMR system itself.

Figure 10:
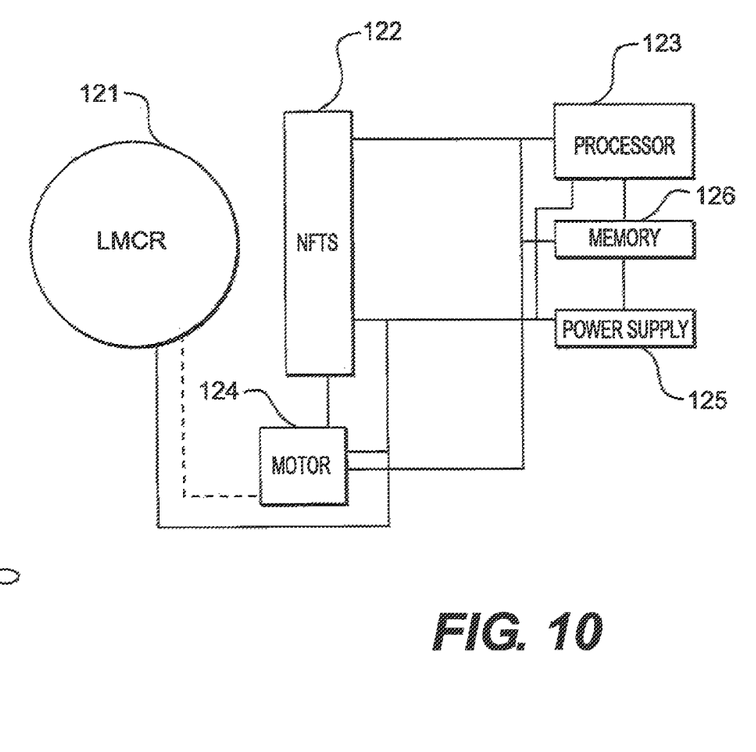
FIG. 10 illustrates an exemplary system for testing an LCMR system with a simulation device.

FIG. 10 illustrates an exemplary system for controlling the testing of LCMR system 121 with a simulation device 122. Processor 123 may be used to control the rotation of simulation device 122; to control the coordination of the phase shifting, doppler modulation, and/or gain adjustments at each of the dipole elements in the phased antenna array of the simulation device 122; to perform necessary calculations in simulating target objects; and to control the sending and receiving of commands and information to and from the system. Processor 123 may be any suitable type of processor. The functions of processor 123 may be provided by a single dedicated processor or by a plurality of processors. Processor 123 may be coupled to simulation device 122, a motor 124, a power supply 125, and a memory 126. Processor 123 may also be coupled to another device for receiving and/or transmitting commands and information to and/or from the processor. The processor could receive and/or transmit commands over wired transmission lines, such as Universal Serial Bus (USB), Ethernet, Internet, FireWire, twisted-pair, coaxial cable, or other wired networks. The processor could also receive/transmit commands wirelessly over a cellular, satellite, IEEE 802.11, terrestrial, or other wireless network. Processor could still further be coupled to another computer providing a user interface allowing input of information and commands to the processor and allowing output of information and commands in a human-readable form.

Motor 124 may receive commands from processor 123 instructing motor 124 to mechanically rotate simulation device 122 around LCMR system 121 to a desired azimuth. Alternatively, simulation device 122 may be in fixed position and motor 124 may mechanically rotate LCMR system 121 to a desired azimuth based on instructions from processor 123. Power supply 125 may supply power to simulation device 122. Power supply 125 could include a grid-sourced power supply, a battery power supply, a generator, or any other known power supply. Power supply 125 may provide power to LCMR system 121, simulation device 122, processor 123, motor 124, memory 126, and/or any other components requiring power in testing LCMR system 121.

Memory 126 may be configured to store instructions that, when executed by processor 123, carry out the exemplary steps of the disclosed embodiments. Memory 126 may also store an operating system, applications, and/or parameters. Data stored on memory 126 may be stored in a single dedicated memory, or a plurality of memory devices. Memory 126 may be any type of physical, non-transient computer-readable medium, volatile or non-volatile, including but not limited to random access memory (RAM), read-only memory (ROM), magnetic storage, semiconductor storage, optical disc storage, and/or magneto-optical disc storage.

Figure 11:
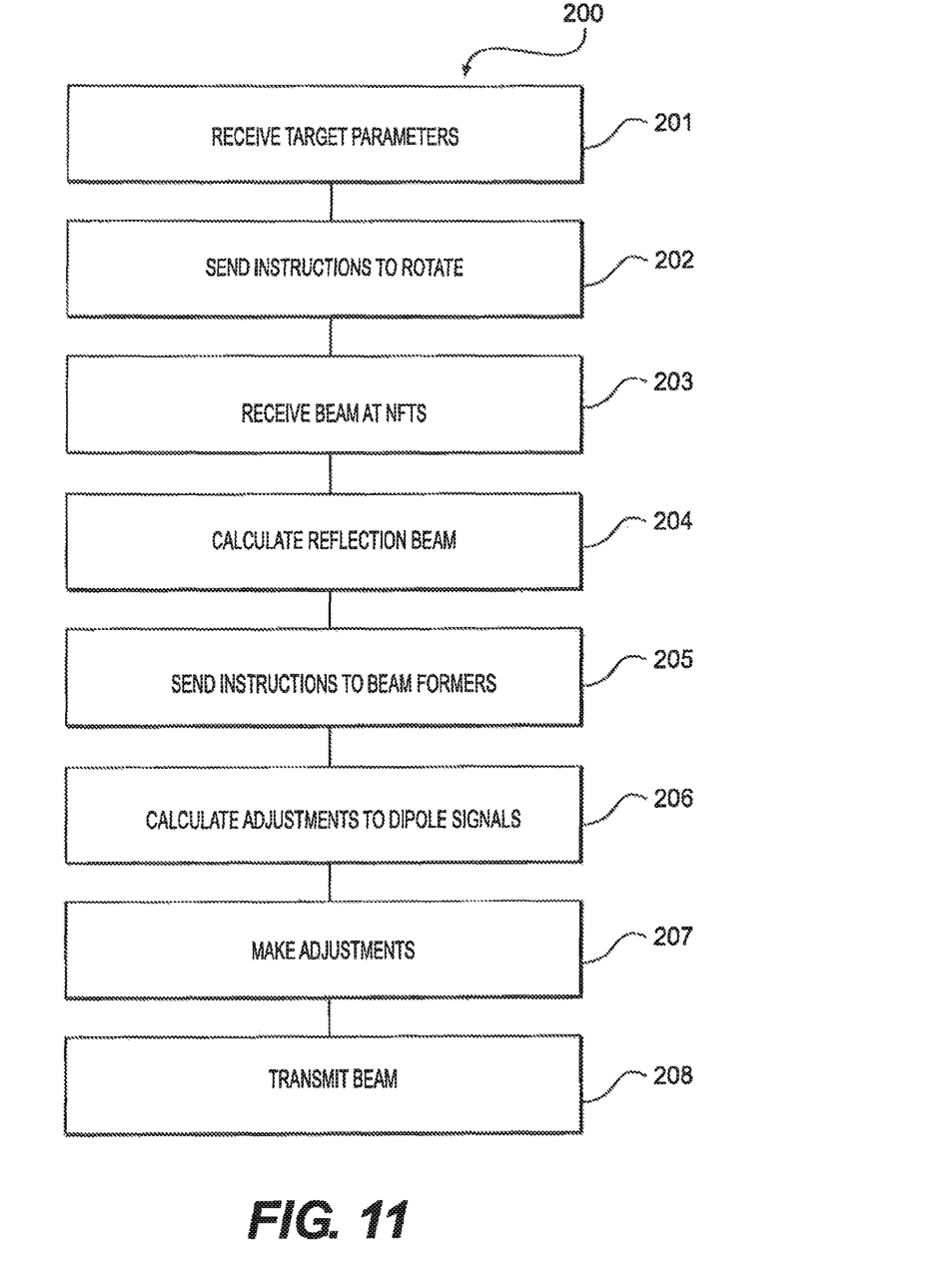
FIG. 11 illustrates an exemplary method for testing an LCMR system with a simulation device.

FIG. 11 depicts a flow diagram of an exemplary method 200 for carrying out the disclosed embodiments. In step 201, parameters of one or more target objects to be simulated may be received. These parameters may include size and shape of one or more targets, as well as azimuth, elevation, distance, trajectory, and/or velocity of the one or more targets. In step 202, the processor may send instructions to rotate the simulation device or LCMR system to a particular azimuth at which the target object is to be simulated. In step 203, the simulation device may receive a radiation beam from the LCMR system, the beam being intercepted by all of the dipole elements in the antenna array of the simulation device. In step 204, a processor may calculate the parameters of an appropriate reflection beam on the basis of the received LCMR radiation pattern and on the parameters of the target object to be simulated. In step 205, the processor may send instructions to an azimuth beam former and phase controller in the top of the frame of the simulation device, and send instructions to elevation beam formers and phase controllers in the sides of the frame of the simulation device. In step 206, these beam formers and phase controllers may calculate adjustments to make to the gain, doppler effects, and phase of each dipole element in the array, and may send the appropriate adjustment parameters for each dipole element to that dipole element's processor element. The beam formers and phase controllers may also transmit time delay instructions to each dipole element's processor element in order to delay the generated outgoing signal, so as to accurately represent the time it would take for a reflection off a target object at a given distance. In step 207, each dipole element's processor may incorporate the appropriate adjustments. In step 208, a signal may be transmitted from each dipole element at the instructed time delay. The signal transmission of all of the dipole elements, in sum, may result in a radiation pattern from the simulation device to the LCMR that accurately represents the reflection that would be expected to be received from one or more target objects having the input characteristics.

Figure 12:
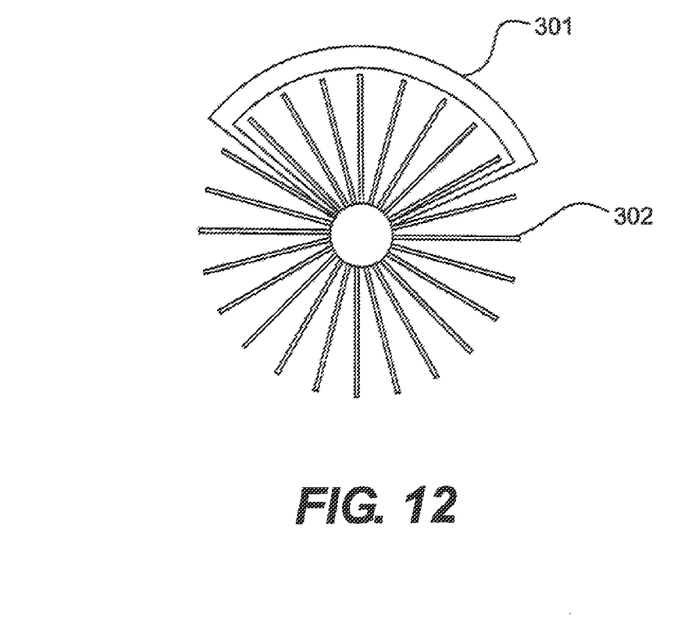
FIG. 12 illustrates a top view of an alternative embodiment of a simulation device that is curved rather than planar.

FIG. 12 illustrates another embodiment of the present disclosure. FIG. 12 illustrates a top view of a simulation device 301 that applies the method described above, but in a curved arrangement that conforms to the shape of LCMR system 302. Rather than the planar phased antenna array described above, simulation device 301 here is organized as a series of curved arrays. The curved arrays may be positioned in a horizontal stack, so as to be orthogonal to the electric field at the radar antenna aperture. Each curved array may be a thin metal strip that has a plurality of dipole antennas placed at regular fixed intervals along the array. The orthogonal placement of each curved array to the electric field of the radar antenna may ensure that the thin metal strips and dipole antennas will scatter almost no energy. As a result, the curved array may be transparent to the normal outgoing (transmitted) and incoming (from targets and the environment) plane waves. The curved arrays may extend well above the active aperture of the antenna in order to generate radiation beams that simulate reflections off of target objects at high elevations. The curved array may be mounted on a stand or may be mounted to the LCMR system itself. In order to simulate a desired azimuth, a motor may rotate the curved array around the LCMR system, or the LCMR system itself may be rotated, similar to that described above for the planar array.

Figure 13:
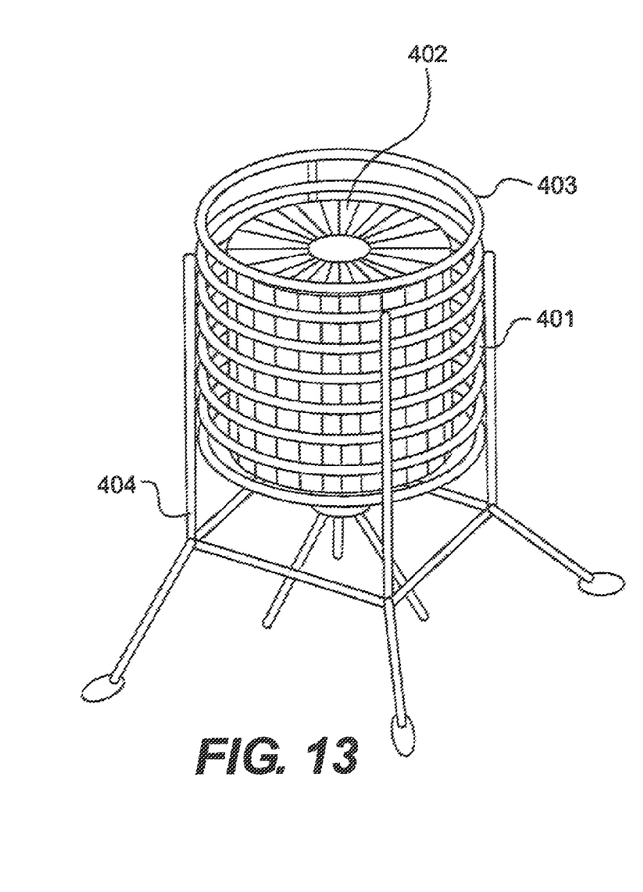
FIG. 13 illustrates a side view of an alternative embodiment of a simulation device that is arranged to surround an LCMR system in a conformal arrangement.

FIG. 13 illustrates a further embodiment of the present disclosure. FIG. 13 illustrates a simulation device that extends the above concept to an all-electronic, non-mechanical embodiment of the device. Rather than the planar phased antenna array described above, simulation device 401 here may be organized in a conformal arrangement of circular arrays that surround LCMR 402. In one embodiment, circular arrays may be positioned in a horizontal stack, so as to be orthogonal to the electric field at the radar antenna aperture. Each circular array 403 may be a thin metal strip that has a plurality of dipole antennas placed at regular fixed intervals along the array. Each array may extend 360 degrees around LCMR system 402. The orthogonal placement of each circular array to the electric field of the radar antenna may ensure that the thin metal strips and dipole antennas will scatter almost no energy. As a result, the circular array may be transparent to the normal outgoing (transmitted) and incoming (from targets and the environment) plane waves. The circular arrays may extend well above the active aperture of the antenna in order to generate radiation beams that simulate reflections off of target objects at high elevations. The circular array may be mounted on a stand 404 or could be mounted to LCMR 402 itself. The advantage of this type of arrangement is that it does not require the moving parts of the planar array described above. Nevertheless, added complexity is associated with generating a plane wave from a circular arrangement, thereby requiring a more complex beam former and finer control at the individual dipole level.

The concept of an electronic, non-mechanical embodiment of the device, such as the circular array embodiment shown in FIG. 13, can further be extended to a radar curtain array arrangement. For example, rather than disposing the dipole elements within circular arrays attached to a stand or to the LCMR system, the dipole elements can be disposed in a similar arrangement within a radar antenna curtain that hangs over the LCMR and conforms to the shape of the LCMR.

The concept of an electronic, non-mechanical embodiment of the device, such as the circular array embodiment shown in FIG. 13, can also be extended to a version built into an antenna. For example, rather than disposing the dipole elements within circular arrays, the array of dipole elements can be built into an antenna of a radar or sensing device during its manufacture.

Figure 14:
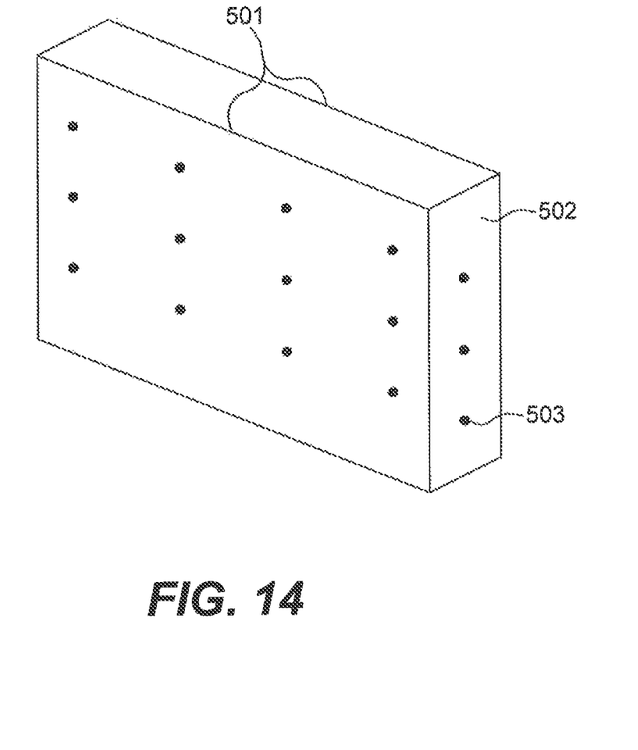
FIG. 14 illustrates a cutaway cross-section of an alternative embodiment of a simulation device in which dipole elements are disposed in a screen, such as a radome.

The concept of an electronic, non-mechanical embodiment of the device, such as the circular array embodiment shown in FIG. 13, may further be extended to a version built into a screen placed over the antenna of a radar or sensing device. Such a screen may be a radome that is transparent to radio waves. For example, rather than disposing the dipole elements within arrays attached to a stand or to the LCMR system, the dipole elements may be embedded into a screen. FIG. 14 illustrates an exemplary cross-section of a portion of a radome with such a configuration. The radome may be constructed with outer and inner layers 501, which may be made of nylon or fiberglass, for example. Another material 502, such as foam, may be sandwiched between the two layers 501. Dipole elements 503 may be embedded within the foam in an arrangement conformal to the antenna, such as the arrangement illustrated in FIG. 13. In the embodiment of FIG. 14, dipole elements 503 may be supported in material 502, and thus may render additional supporting structures for the dipole elements, such as those illustrated in FIG. 13, unnecessary.

Those skilled in the art will appreciate that the embodiments of the present disclosure, as described above, could be used in a variety of applications. As already discussed above, the simulation device can be used to test sensor and/or radar systems by simulating one or more target objects. The simulation device can simulate air targets and ground targets, or separate versions can be used for testing air targets and ground targets. The simulation device can be used for simulating rockets, artillery, mortars, aircraft, unmanned aerial vehicles (UAV), cruise missiles, ballistic missiles, and other moving objects.

The simulation device could also be used for simulating environmental effects. For example, the simulation device could be used to simulate intentional or unintentional jamming devices. The simulation device can also be used for simulating environmental clutter. The simulation device can also be used for simulating other interference in the field, such as wind turbine interference.

The simulation device can also be used for measuring the antenna pattern of an antenna. Whereas near field scanners operate like a raster scan in mapping an antenna's radiation pattern, the simulation device is capable of mapping the antenna pattern in real time, because of its two-dimensional shape. In addition to all of the above, one of ordinary skill will recognize that the simulation device has a variety of other uses for anyone building or testing a sensor or radar system.

In addition to testing an LCMR system, the simulation device concept can also be extended to simulation devices for a variety of other radars, including EQ-36 Counterfire Target Acquisition Radar; G/ATOR; C-RAM and EAPS; LSTAR; OWL; MEADS; shipboard radars, such as SPY/Dahlgren; airborne radars; ground-based radars; and other radar systems. The simulation device concept can further be extended to sensing devices, including ELINT and ESM receivers, communication systems with moving platforms, and other sensing devices. One skilled in the art will appreciate that the arrangement and spacing of the dipole elements may be varied to conform to the type of radar or sensing device that is being tested.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

The invention claimed is:

1. A computer-implemented method for simulating target objects, the method comprising:
    receiving parameters corresponding to characteristics of one or more target objects to be simulated;
    receiving, by a simulation device, a first beam of near-field electromagnetic radiation from a radar device, the simulation device having an antenna array greater than or substantially equal to an aperture of the radar device, the antenna array being substantially transparent to a normal operation of the radar device;
    calculating, by a processor based on the first beam of the near-field electromagnetic radiation, characteristics of a beam of far-field electromagnetic radiation expected to be received by the radar device and reflect off of the one or more target objects having the parameters; and
    transmitting, by the simulation device, a second beam based on the calculated characteristics corresponding to the beam of the far-field electromagnetic radiation.

2. The method of claim 1, wherein the parameters correspond to at least one of an azimuth, elevation, distance, trajectory, and velocity of the one or more target objects.

3. The method of claim 1, wherein the second beam is generated by transmitting signals from a plurality of dipole antennas in the antenna array.

4. The method of claim 3, wherein the second beam is generated by adjusting at least one of phase, doppler, and amplitude characteristics of the signal transmitted from at least one of the plurality of dipole antennas.

5. The method of claim 4, wherein the second beam of radiation is generated by varying at least one of phase, doppler, and amplitude characteristics across the plurality of dipole antennas.

6. The method of claim 1, wherein the second beam includes a plane wave corresponding to the far-field electromagnetic radiation.

7. The method of claim 1, wherein the second beam is generated by transmitting signals from a plurality of dipole antennas embedded in a radome.

8. The method of claim 1, wherein the antenna array includes a plurality of dipole antennas embedded in a plurality of slats that are positioned orthogonal to the electric field of the radar device.

9. The method of claim 8, wherein the plurality of slats are rotatably coupled to the radar device.

10. The method of claim 1, wherein the processor further calculates a delay based on the one or more target objects to be simulated, and wherein transmission of the second beam is delayed based on the calculated delay.

11. A system for simulating target objects, the system comprising:
    an array of antenna elements configured to receive a first beam of near-field electromagnetic radiation from a radar device and transmit a second beam of electromagnetic radiation, the array being greater than or substantially equal to an aperture of the radar device, and the antenna array being substantially transparent to a normal operation of the radar device; and
    a processor configured to:
        receive parameters indicating characteristics of one or more target objects to be simulated;
        calculate characteristics of a beam of far-field electromagnetic radiation expected to be received by the radar device and reflect off of the one or more target objects having the parameters, based on the first beam of the near-field electromagnetic radiation; and
        cause the array to transmit a second beam based on the calculated characteristics corresponding to the beam of the far-field electromagnetic radiation.

12. The system of claim 11, wherein the parameters correspond to at least one of an azimuth, elevation, distance, trajectory, and velocity of the one or more target objects.

13. The system of claim 11, wherein the array generates the second beam by transmitting signals from the antenna elements in the array.

14. The system of claim 13, further comprising one or more beam formers configured to adjust at least one of phase, doppler, and amplitude characteristics of the signal transmitted from at least one of the antenna elements in the array.

15. The system of claim 14, wherein the processor causes at least one of phase, doppler, and amplitude characteristics to be varied across the plurality of antenna elements.

16. The system of claim 11, wherein the second beam includes a plane wave corresponding to the far-field electromagnetic radiation.

17. The system of claim 11, wherein the array of antenna elements are embedded in a radome.

18. The system of claim 16, wherein the array of antenna elements are embedded in a plurality of slats that are positioned orthogonal to the electric field of the radar device.

19. The system of claim 18, wherein the plurality of slats are rotatably coupled to the radar device.

20. The system of claim 11, wherein the processor further calculates a delay based on the one or more target objects, and wherein the processor causes the array to delay transmission of the second beam of electromagnetic radiation based on the calculated delay.

21. The system of claim 11, wherein the array of antenna elements includes a plurality of dipole antenna elements.

22. The system of claim 11, wherein the array is disposed substantially immediately in front of the aperture of the radar device.

23. A computer readable medium including instructions, which, when executed by a processor, cause the processor to execute a method for simulating target objects, the method comprising:
receiving parameters indicating characteristics of one or more target objects to be simulated;
receiving, at a simulation device, a first beam of near-field electromagnetic radiation from a radar device, the simulation device having an antenna array greater than or substantially equal to an aperture of the radar device, and the antenna array being substantially transparent to a normal operation of the radar device;
calculating characteristics of a beam of far-field electromagnetic radiation expected to be received by the radar device and reflect off of the one or more target objects having the parameters, based on the first beam of the near-field electromagnetic radiation; and
transmitting a second beam based on the calculated characteristics corresponding to the beam of the far-field electromagnetic radiation.

24. A computer-implemented method for simulating target objects, the method comprising:
receiving parameters indicating characteristics of one or more target objects to be simulated;
receiving, by a simulation device, a first beam of near-field electromagnetic radiation from a radar device, the simulation device having an array of dipole antenna elements, the array of dipole antenna elements being substantially transparent to a normal operation of the radar device;
calculating, by a processor, characteristics of a beam of far-field electromagnetic radiation expected be received by the radar device and to reflect off of the one or more target objects having the parameters, based on the first beam of the near-field electromagnetic radiation; and
transmitting a second beam based on the calculated characteristics corresponding to the beam of the far-field electromagnetic radiation.

25. The method of claim 24, wherein the parameters correspond to at least one of an azimuth, elevation, distance, trajectory, and velocity of the one or more target objects.

26. The method of claim 24, wherein the second beam includes a plane wave corresponding to the far-field electromagnetic radiation.

27. A system for simulating target objects, the system comprising:
an array of dipole antenna elements configured to receive a first beam of near-field electromagnetic radiation from a radar device and transmit a second beam of electromagnetic radiation, the array of dipole antenna being substantially transparent to a normal operation of the radar device; and
a processor configured to:
receive parameters indicating characteristics of one or more target objects to be simulated;
calculate characteristics of a beam of far-field electromagnetic radiation expected to be received by the radar device and reflect off of the one or more target objects having the parameters, based on the first beam of the near-field electromagnetic radiation; and
cause the array to transmit the second beam based on the calculated characteristics corresponding to the beam of the far-field electromagnetic radiation.

* * * * *